United States Patent [19]

Ueda

[11] 4,304,146
[45] Dec. 8, 1981

[54] GRIP DIMENSION ADJUSTABLE BRAKE OPERATING DEVICE

[75] Inventor: Toshiyuki Ueda, Higashiosaka, Japan

[73] Assignee: Shimano Industrial Company Limited, Osaka, Japan

[21] Appl. No.: 133,599

[22] Filed: Mar. 24, 1980

[30] Foreign Application Priority Data

Apr. 3, 1979 [JP] Japan .................. 54-44960[U]

[51] Int. Cl.³ .................. B62L 3/02; B62K 23/06; G05G 5/04
[52] U.S. Cl. .................. 74/489; 74/501 R; 74/526
[58] Field of Search .................. 74/488, 489, 501 R, 74/526

[56] References Cited

U.S. PATENT DOCUMENTS 4,084,449  4/1978  Kine .................. 74/489 X
4,222,285  9/1980  Kine .................. 74/526 X

FOREIGN PATENT DOCUMENTS 2915164  10/1979  Fed. Rep. of Germany ........ 74/489

*Primary Examiner*—Allan D. Herrmann
*Attorney, Agent, or Firm*—Stevens, Davis, Miller & Mosher

[57] ABSTRACT

A brake operating device comprises a lever pivoted to a bracket member which is fixed to a handle bar at a bicycle and a retainer attached to one end of a control wire and supported to the lever. A support having a receiving portion for receiving therein the retainer, is formed and supported in a turnable manner to the lever, and a gap sustainer interposable between a front wall of the bracket member and a front surface of the lever is provided at the support, whereby the grip dimension a distance between a handle bar and lever is made changeable by a turn of the support to control the interposing of the gap sustainer between the front wall of the bracket member and front surface of the surface.

5 Claims, 10 Drawing Figures

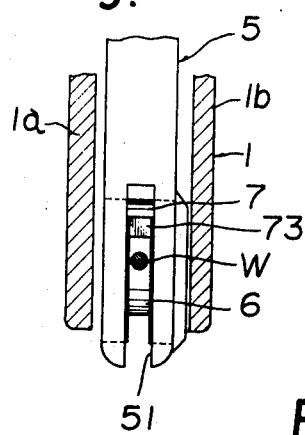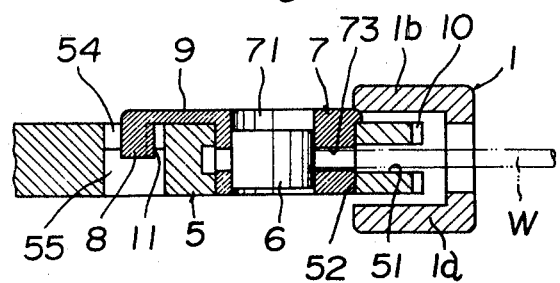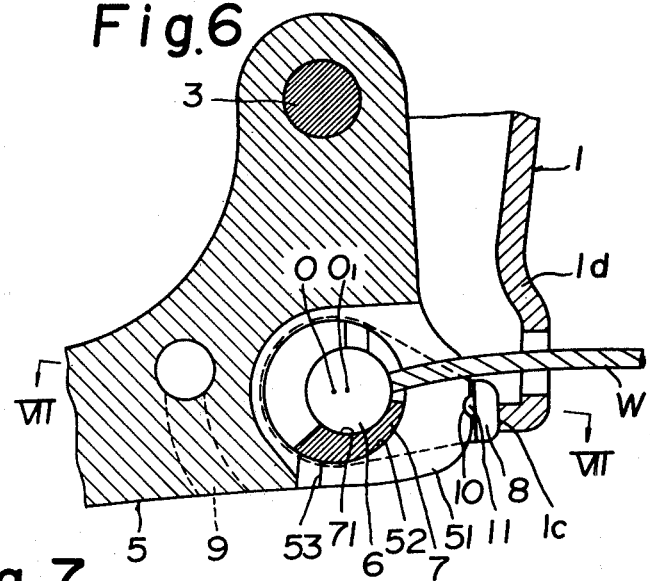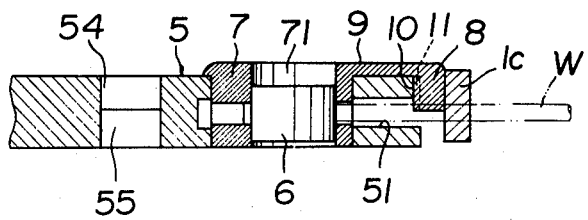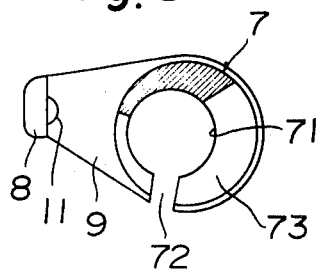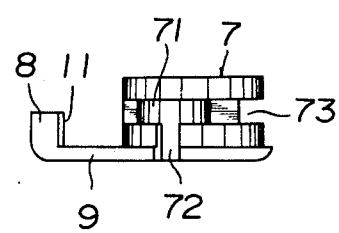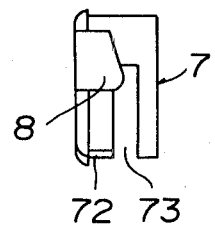

4,304,146

GRIP DIMENSION ADJUSTABLE BRAKE OPERATING DEVICE

BACKGROUND AND SUMMARY OF THE INVENTION

This invention relates to a brake operating device, and more particularly to a brake operating device which pulls a control wire to operate a bicycle brake.

Generally, this kind of brake operating device comprises a brake lever pivotally supported on a bracket member fixed to a handle bar at the bicycle and a retainer fixed to the lever and attached to one end of the control wire which is secured at the other end to the bicycle brake, so that the lever can be gripped to pull the wire and actuate the brake.

A conventional brake operating device, however, has a constant distance between the lever and the bicycle handle bar which may be too large or small to fit the different hand sizes of different drivers.

In the light of this problem, this invention has been disigned. A main object of the invention is to provide a brake operating device having an easily changed grip dimension. Another object of the invention is to provide a brake operating device having a grip dimension which can be easily changed without changing the relative effective length between a brake control wire and an outer sheath guiding the wire.

This invention is characterized in that a support, which has a receiving portion or receiving bore receiving therein a retainer attached to one end of the control wire, is formed and supported in a tubular manner to a brake lever pivoted to a bracket member, and that a gap sustainer is provided at the support interposable between the front wall of the bracket member and the front surface of the lever opposite to the front wall, so that the support turns to interpose or remove the sustainer into or from a gap between the front wall of the bracket member and the front surface of the lever to thereby change the grip dimension.

The retainer for the control wire is housed within and is rotatable with respect to the support in a relation of being rotatable with respect thereto and is shiftable at its axis of rotation toward the gap sustainer with respect to the axis of rotation of the support. The amount of the shifting is defined to be equal to about half the thickness of the gap sustainer. Hence, the support turns to enable the grip dimension to change without changing the relative effective length between the wire and the outer sheath used for guiding the wire.

Furthermore, the support is separate from the lever, whereby the gap sustainer provided at the support can have its thickness changed to make it possible to change the grip dimension in plural stages. Accordingly, it is possible to provide a brake operating device of simple construction, which by virtue of that turnable support adjusts the grip dimension to a different size cyclist's hand.

These and other objects and novel features of the invention will be more apparent from the following description of an embodiment of the invention in accordance with the accompanying drawings.

BRIEF DESCRIPTION OF THE DRAWINGS

FIG. 4 is a sectional view taken on the line IV—IV in FIG. 3, FIG. 5 is a sectional view taken on the line V—V in FIG. 3, FIG. 6 is a partially enlarged sectional view of the brake operating device in FIG. 2, FIG. 7 is a sectional view taken on the line VII—VII in FIG. 6, FIG. 8 is a longitudinally sectional front view of a support, FIG. 9 is a bottom plan view thereof, and FIG. 10 is a side view of the same.

DETAILED DESCRIPTION OF THE INVENTION

Figure 1:
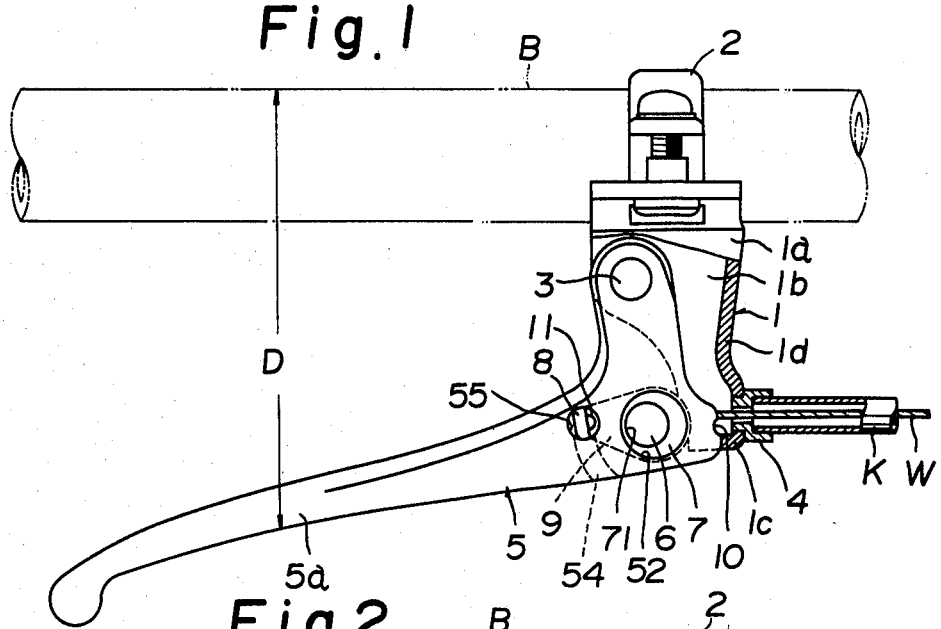
FIGS. 1 and 2 are partially cutaway side views of an embodiment of a brake operating device of the invention, which is mounted on a handle bar.

Referring to the drawings, reference numeral 1 designates a bracket member fixed to a handle bar B of the bicycle through a tightening band 2 integral with the braket member. The bracket member 1 comprises two opposite side walls 1a and 1b and a front wall 1d connecting the side walls 1a and 1b and having an extension wall 1c. A lever shaft 3 is provided across the side walls 1a and 1b, and a tubular support 4 for an outer sheath K guiding a control wire W is attached to the front wall 1d.

Reference numeral 5 designates a lever swingably supported on the lever shaft 3 at the bracket member 1. The lever 5 is provided at a portion at the side of lever shaft 3 with a recess 51 through which the wire W is insertable, a bore 52 extending transversely of the recess 51, and a wire guide groove 53. The bore 52 accommodates therein a support 7 to be hereinafter described and supports it in a turnable manner.

The support 7 carries a columnnar retainer 6 attached to one end of the wire W which is fixed at the outer end to the brake, and is formed mainly of synthetic resin.

Also, the support 7, as shown in FIGS. 8 through 10, has a short cylindrical shape and is provided at its central portion with a receiving bore 71 into which the retainer 6 is rotatably inserted, at the lateral side with a bore 72 which is directed to the center $O_1$ of the bore 71 and through which the wire W is insertable, and at an axially intermediate portion with a wire guide groove 73 opening at the receiving bore 71.

The receiving bore 71 is shifted at the center $O_1$ thereof by a length of a toward a gap sustainer 8 to be hereinafter described, with respect to the axis O of rotation of the support 7. The length a of the shifting is set to be about half the thickness of the gap sustainer 8, so that, when the support 7 turns through an angle of 180°, the center $O_1$ of receiving bore 71 shifts to an extent corresponding to thickness of the gap sustainer 8.

Figure 2:
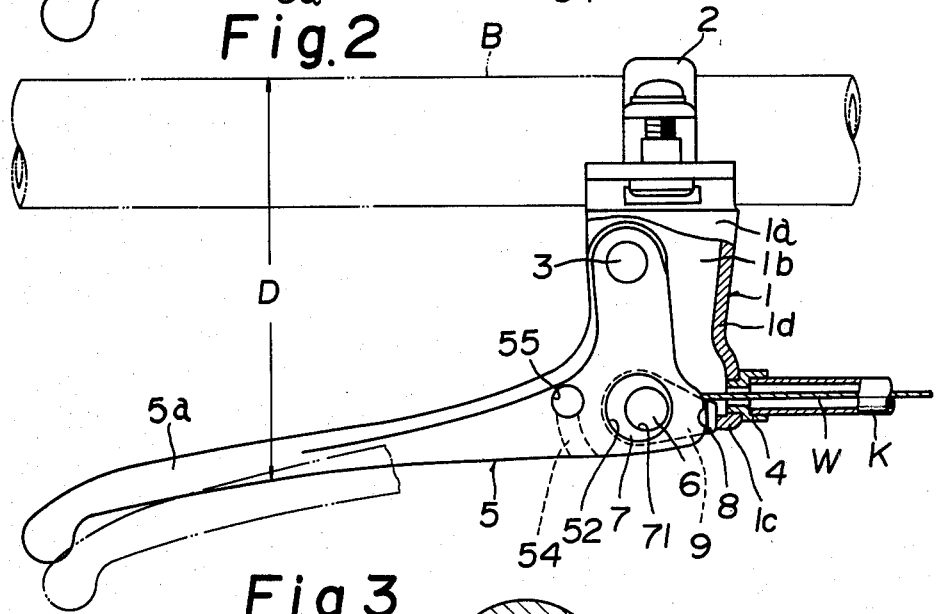

The gap sustainer 8 is connected through a connector 9 integrally with the support 7 at its one side in the direction of turning of the support 7, and functions to change a distance D, i.e., the so-called grip dimension, between a grip 5a of the lever 5 and the handle bar B in such a manner that the gap sustainer 8, as shown in FIGS. 1 and 2, is interposed into or removed from a gap between the front surface of lever 5 and the extension wall 1c from the front wall 1d at the bracket member 1. The gap sustainer 8 shown in the drawings can change the distance D in one stage only. However, the thickness of gap sustainer 8 can be made to change in the turning direction of the support 7 to enable the distance D to change in plural stages. A recess 10 is provided at one of the opposite surfaces at the sustainer 8 and lever 5, and a projection 11 engageable with the recess 10 is provided at the other, to hold the support 7, in position, and prevent it from carelessly turning. In addition, although the support 7 preferably turns through a 180° angle, it is sufficient if it turns through about a 180° angle.

Figure 3:
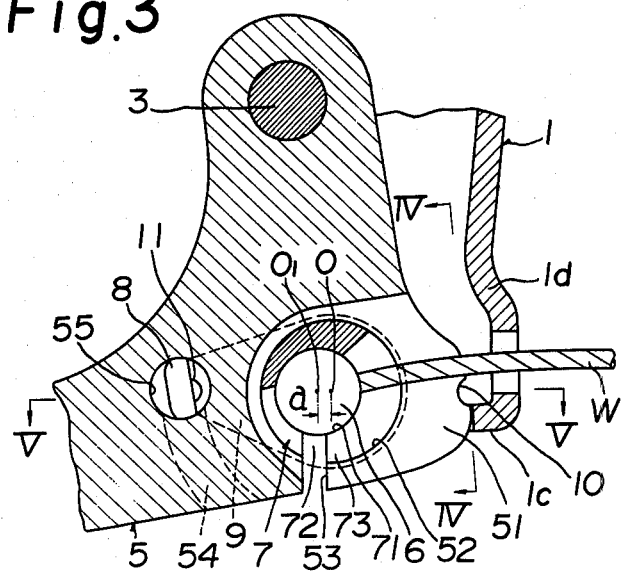
FIG. 3 is a partially enlarged sectional view of the brake operating device in FIG. 1.

At the lateral side of lever 5 is provided a guide groove 54 of a circular arc around the axis O of rotation of the support 7. The guide groove 54 is provided at its inner end with a round retaining bore 55 into which the gap sustainer 8 can enter, so that, when the support 7 turns, as shown in FIGS. 1, 3 and 5, the gap sustainer 8 is guided through the guide groove 54 and retained within the bore 55.

Instead of a synthetic resin, the support 7 may be made from metallic material, such as light alloy. However, a synthetic resin support 7 can be formed integrally with the gap sustainer 8 and connector 9, and can reduce a skid resistance between the support 7 and the retainer 6 within the receiving bore 71, thereby making the retainer 6 slidable with respect to the surface of receiving bore 71. As a result the retainer 6 cannot jam which might lead to a cutting of the wire W.

The brake operating device of the invention, functions to change the grip dimension as follows. The bracket member 1, as shown in FIG. 1, is mounted on the handle bar B in its particular position and the gap sustainer 8 is inserted into the retaining bore 55. In this instance, when the distance D, i.e., the grip dimension, is too large to fit a cyclist's hand, the gap sustainer 8 is turned counterclockwise through a 180° angle in FIG. 1 and is interposed between the front surface of lever 5 and the front wall 1d, or more accurately extension wall 1c, as shown in FIG. 3. Consequently, the lever 5 turns clockwise in FIG. 2 to an extent corresponding to the thickness of the gap sustainer 8, whereby the grip dimension becomes smaller to fit the cyclist's hand.

On the other hand, the bracket member 1, as shown in FIG. 2, may be mounted on the handle bar B in its particular position with the gap sustainer 8 interposed between the front surface of lever 5 and the extension wall 1c. In this instance, if the grip dimension is too small to fit a cyclist's hand, the sustainer 8 is turned clockwise in FIG. 2 through a 180° angle and is removed from the gap entering the retaining bore 55 through the guide groove 54. Consequently, the lever 5 turns counterclockwise in FIG. 1 to an extent corresponding to the thickness of the sustainer 8, whereby the grip dimension increases to fit the cyclist's hand.

Now, when the support 7 is turned through a 180° angle around the axis O of its rotation in order to change the grip dimension, the center $O_1$ of the receiving bore 71 shifts toward or from the gap sustainer 8 to an extent of its thickness due to the fact that the receiving bore 71 is displaced at its center $O_1$ by about half of the thickness of the gap sustainer 8 with respect to the axis O of rotation of the support 7. As a result, no change is created in the relative effective length between the control wire W connected to the retainer 6 received within the receiving bore 71 and the outer sheath K secured to the tubular support 4 at the bracket member 1. Therefore, a clearance existing between the brake shoe and the braked member, such as a wheel rim, can be kept constant, and proper braking action is always executed regardless of a change in the grip dimension.

As stated, the receiving bore 71 in the above described embodiment is shifted at the center $O_1$ with respect to the axis O of rotation of the support 7 so as not to change the relative effective length between the wire W and the outer sheath K. Alternatively, the center $O_1$ may coincide with the axis O. In other words, the receiving bore 71 may be coaxial with the support 7, such that a change of the grip dimension due to a turning of support 7, affects the positional relation between the wire W and the outer sheath K to change the brake shoe to braked member clearance. As a remedy for this, the change of grip dimension should be accompanied by an adjustment of the positional relation between wire W and outer sheath K.

As clearly understood from the above description, the brake operating device of the invention is so simple in construction that the support, which supports one end of the control wire and is provided with the gap sustainer, is merely attached to the lever in a turnable manner to change the grip dimension. Accordingly, even when attached to non-standard handle bars, the brake operating device of the invention is able to change the grip dimension correspondingly to the form of handle bar and the size of a cyclist's hand.

Furthermore, the grip dimension is changeable simply and easily only by turning the support.

While a preferred embodiment of the invention has been described, such description is for illustrative purpose only, and it is to be understood that changes and variations may be made without departing from the spirit or scope of the invention which is defined by the following claims.

What is claimed is:

1. A brake operating device for operating a bicycle brake by pulling a control wire comprising:
   a bracket member fixed to a handle bar of the bicycle, said bracket member being provided with a front wall having a through bore through which said wire is inserted;
   a lever pivoted to said bracket member, said lever having a front surface opposite to said front wall of said bracket member;
   a retainer for fixing one end of said wire, the other end of said wire being fixed to said brake; and
   a support turnably supported to said lever and having a receiving portion for receiving therein said retainer, said support having at one side in the turning direction thereof a gap sustainer capable of being interposed between the front wall of said bracket member, and the front surface of said lever when said support is turned to a predetermined position.

2. A brake operating device according to claim 1, wherein said retainer is rotatably supported by said receiving portion and has an axis of rotation which is shiftable toward said gap sustainer and relative to the turning axis of said support.

3. A brake operating device according to claim 2, wherein the amount of shifting of said retainer relative to the turning axis of said support is approximately half of the thickness of said gap sustainer.

4. A brake operating device according to claim 1, wherein a guide groove for said gap sustainer is provided at the lateral side of said lever, said gap sustainer being engageable with said guide groove when said support is turned to a second predetermined position.

5. A brake operating device according to claim 1, 2 or 4, wherein a projection is provided at one of said gap sustainer and the front surface at said lever, and an engaging portion engageable with said projection is provided at the other, said projection engaging with said engaging portion when said gap sustainer is interposed between the front surface of said lever and the front wall of said bracket member, to thereby maintain said gap sustainer in said interposed position.

* * * * *